T. BAILEY.
Water-Pressure Check-Valve.

No. 130,835.  Patented Aug. 27, 1872.

Witnesses:
A. Bennerkendorf
W. A. Graham

Inventor:
T. Bailey
Per Munn & Co.
Attorneys.

UNITED STATES PATENT OFFICE.

THOMAS BAILEY, OF NEW YORK, N. Y.

IMPROVEMENT IN WATER-PRESSURE CHECK-VALVES.

Specification forming part of Letters Patent No. 130,835, dated August 27, 1872.

Specification describing a new and useful Improvement in Water-Pressure Check-Valve, invented by THOMAS BAILEY, of the city, county, and State of New York.

The object of this invention is to provide a remedy for the frequent bursting of water-pipes and range-boilers in dwellings and other buildings, when such pipes are used under pressure.

The fact that water is practically a non-compressible and non-elastic fluid is overlooked by "plumbers," and no means are provided to prevent the sudden shocks to which water-pipes are subjected when stop-cocks are instantly closed and the momentum of a column of water is suddenly checked.

My invention is designed to remedy this difficulty; and it consists in a valve in combination with an air-chamber arranged as hereinafter more fully described.

Figure 1:
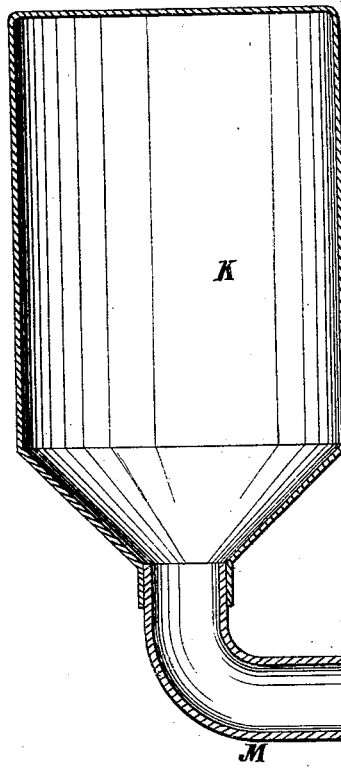
Figure 1:
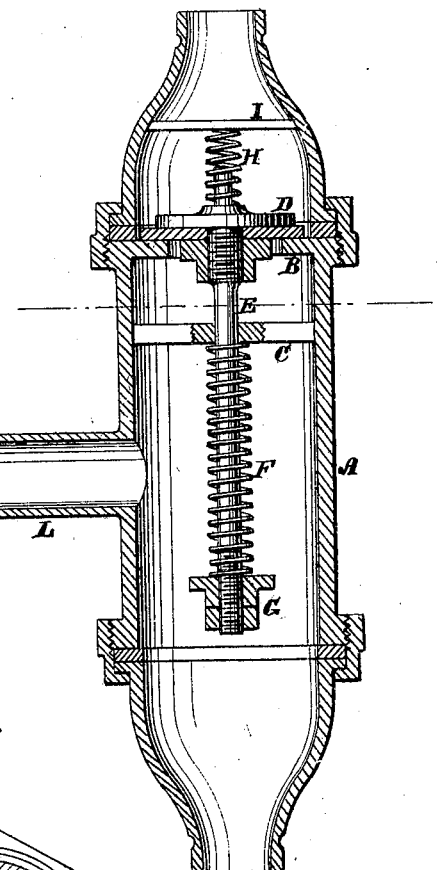
Figure 2:
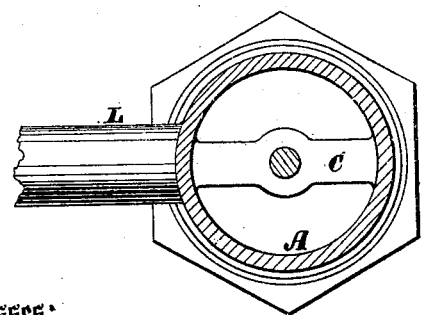

In the annexed drawing, Figure 1 is a vertical longitudinal section of my check-valve and air-chamber, showing its general construction and arrangement of parts. Fig. 2 is a horizontal section of Fig. 1 taken on the line $x$ $x$.

Similar letters of reference indicate corresponding parts.

A is the valve-tube, to the ends of which the water-pipe is attached, or the tube is inserted so as to form a part of the water-pipe. This tube is made in one or more parts, and has cross-partitions, one of which, B, forms the valve-seat, and another, C, a guide for the valve-rod. D is the valve, and E is the valve-rod. On the valve-rod is a spiral spring, F, and on its extreme end is a screw-nut, G. The spring bears against the partition C, and its tension is increased by screwing up the nut. The valve is held to its seat with a force proportioned to the tension of the spring, and this tension is made to vary according to the pressure or head of the water. Where the pressure is great, a secondary spring, H, may be used, as seen in Fig. 1, which bears against the partition I and on the top of the valve. J represents packing between the valves and the valve-seat. K is an air-chamber of any suitable form or dimensions, connected with the tube A by the branch-pipe L and neck-pipe $m$, by the union-nut N, or in any other suitable manner.

When any stop-cock connected with the water-pipe is closed suddenly, and the momentum of the flowing water instantly arrested, the pipe will receive no shock nor be in danger of bursting, as the air in the air-chamber will receive the shock and be compressed, and thus relieve the pipe.

By means of the nut the valve can be adjusted to suit any head of water, and so as to protect the pipe as well as the range-boilers connected therewith.

Having thus described my invention, I claim as new and desire to secure by Letters Patent—

1. The combination of the valve D, rod E, spring F, a stop-bar $c$, tube A, and air-chamber K, substantially as shown and described.

2. In a valve for regulating the pressure in water-pipes, the combination of the valve D, rod E, and spring F, as shown and described.

THOMAS BAILEY.

Witnesses:
T. B. MOSHER,
W. A. GRAHAM.